United States Patent
Goossen (10) Patent No.: US 6,704,513 B1
(45) Date of Patent: Mar. 9, 2004

(54) ENHANCED TILT OPTICAL POWER EQUALIZER

(75) Inventor: Keith Wayne Goossen, Aberdeen, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 622 days.

(21) Appl. No.: 09/677,102

(22) Filed: Sep. 29, 2000

Related U.S. Application Data (63) Continuation-in-part of application No. 09/217,710, filed on Dec. 21, 1998.

(51) Int. Cl.[7] .................................................. H04J 14/02
(52) U.S. Cl. ........................... 398/94; 398/79; 359/290; 359/291
(58) Field of Search .................................. 359/291, 290, 359/248; 398/94, 79; 372/20, 43, 44

(56) References Cited

U.S. PATENT DOCUMENTS

| | | | |
|---|---|---|---|
| 5,654,819 A | 8/1997 | Goossen et al. ............ 359/291 |
| 5,751,469 A | 5/1998 | Arney et al. ................. 359/291 |
| 5,835,256 A | * 11/1998 | Huibers ....................... 359/291 |
| 6,046,840 A | * 4/2000 | Huibers ....................... 359/291 |
| 6,324,192 B1 | * 11/2001 | Tayebati ...................... 372/20 |
| 6,337,753 B1 | * 1/2002 | Goossen ....................... 398/79 |

OTHER PUBLICATIONS

Goossen et al. "Micromechanical Gain Slope Compensator for Spectrally Linear Optical Power Equalization" IEEE Photonics Technology Letters, vol. 12, No. 7, pp. 831–833, Jul. 2000.

* cited by examiner

*Primary Examiner*—Jason Chan
*Assistant Examiner*—David C. Payne

(57) ABSTRACT

An electro-optic device for use in wavelength division multiplexed systems. The device comprises a layer structure having two adjustable air gaps. Optical response of the device can be changed by adjusting spacings of the air gaps. The device can be used as an optical power equalizer in wavelength division multiplexed systems.

36 Claims, 8 Drawing Sheets

ENHANCED TILT OPTICAL POWER EQUALIZER

CROSS REFERENCE TO RELATED APPLICATIONS

This application is a continuation-in-part of a U.S. patent application, Ser. No. 09/217,710, entitled "Optical Power Equalizer", filed on Dec. 21, 1998, which is incorporated herein by reference in its entirety.

FIELD OF THE INVENTION

The invention relates to a device and a method for use in wavelength division multiplexed (WDM) systems, and more particularly, to a device and a method for optical power equalization in WDM systems.

BACKGROUND OF THE INVENTION

Many fiber optic communications systems have been commercialized in which multiple wavelengths are used to carry the signals, thus increasing capacity. These are referred to as wavelength division multiplexed (WDM) systems.

In a typical lightwave WDM system, especially those operating over long distances, the power level of the signal changes as a function of wavelength. This causes some channels to have higher power levels than others, and is known in the art as tilt. Excessive tilt in the power spectrum is a serious disadvantage since the individual channels must be compensated for unequal power levels, which raises the cost of the overall system. Techniques for overcoming tilt in WDM systems have been devised.

For example, Moving Anti-Reflection Switch (MARS) devices have been proposed as power equalizers. The basic MARS device structure and operation are well known. The MARS device typically has a movable conductive membrane suspended over a conductive substrate. With an appropriate electrostatic field, the membrane can be controllably moved towards, or away from, the substrate, thus producing a precisely controlled air gap between the membrane and the substrate. With proper positioning of the membrane with respect to the substrate, the MARS device can be switched from a reflecting state to an anti-reflecting state. Additional details of the MARS device are described in K. W. Goossen, J. A. Walker, and S. C. Arney, "Silicon Modulator based on Mechanically-Active Anti-Reflection Layer with 1 Mbit/sec Capability for Fiber-in-the-Loop Applications", IEEE Phot. Tech. Lett., vol. 6, pp. 1119–1121, September 1994; while the basic structure and properties of a MARS device with a movable membrane are also described in U.S. Pat. No. 5,751,469, issued May 12, 1998, both of which are incorporated herein by reference.

According to this approach, two or more MARS devices, one having positive tilt and the other having negative tilt are used. By adjusting air gaps of the two devices, power equalization can be obtained over the WDM band of the system.

While this approach to power equalization is effective, other solutions may provide more design options and possibly simpler devices.

SUMMARY OF THE INVENTION

Embodiments of the invention provide a device and a method for modulating an optical signal. The device comprises a multi-layer structure incorporating at least two gaps with variable spacings. The gap spacings can be varied by electrically biasing a movable membrane in the device, resulting in a change in optical response, e.g., reflectivity, of the device. Such a device can be used as an optical power equalizer in a wavelength division multiplexed system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Embodiments of the invention provide generally a device for use in a wavelength division multiplexed (WDM) system, e.g., as an optical power equalizer by providing tilt compensation. A device of the invention comprises a multilayer structure having at least two adjustable air gaps. By changing the air gap spacings, the spectral response of the device, e.g., optical reflectivity, can be varied to compensate for tilt in the power spectrum of the WDM system.

Figure 1:
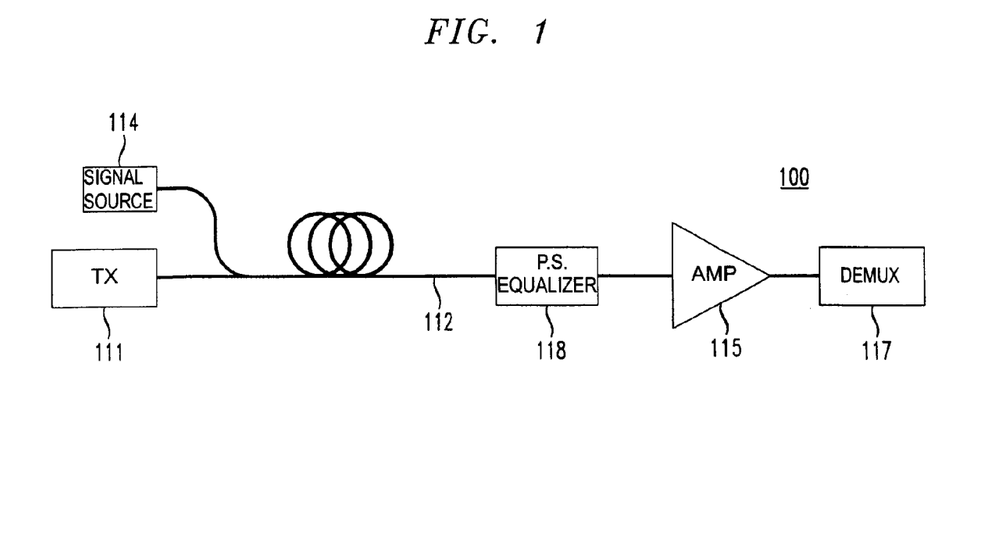
FIG. 1 is a schematic representation of a wavelength division multiplexed system with a power equalizer.

FIG. 1 is a schematic representation of a WDM system 100 incorporating a power spectrum equalizer 118. An optical transmitter 111 generates a wideband signal comprising multiple channels. The optical signal traverses transmitting fiber 112, which is typically a long haul fiber. Additional channels may be added as represented by another signal source 114 coupled into the main transmission fiber 112. Amplifiers, one of which is shown at 115, are provided along the transmission path. Typically the amplifiers are erbium doped fibers.

The multiplexed signal is demultiplexed at the output end by a demultiplexer 117. Channels may be added or split off at any point along the transmission path. The addition and subtraction of channels to the main transmission fiber 112, coupled with other variables such as temperature, microbending losses, . . . , etc., cause variations in the optical power of signals in the fiber 112. These optical power variations, or tilt, are essentially monotonic, with power reduced most at one end of the WDM spectrum, and least at the other. The power spectrum equalizer 118 is inserted into the WDM system 100, preferably before amplifier 115, to compensate for these power variations.

A micromechanical device with one adjustable air gap has previously been proposed to function as the power spectrum equalizer 118. Such a single-gap device has been disclosed in a commonly assigned U.S. patent application Ser. No. 09/217,710, entitled "Optical Power Equalizer", filed on Dec. 21, 1998, which is herein incorporated by reference in its entirety. A brief description of the single-gap device is given below to provide some background for the dual-gap device of the present invention.

Figure 2:
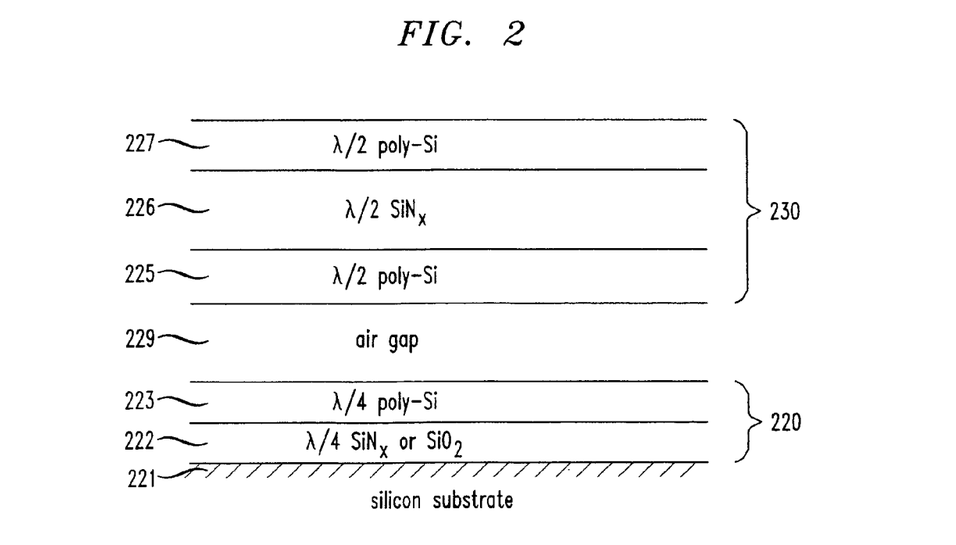
FIG. 2 is a schematic representation of a structure of a single-gap device.

FIG. 2 is a schematic representation of a structure of an electro-optic single-gap device 200, which is designed to function as a reflective filter that operates within a certain spectral range characterized by a center (or reference) wavelength, designated as $\lambda_c$.

In this example, a substrate 220 comprises a silicon substrate 221 coated with two material layers 222 and 223. The material layer 222 may either be silicon nitride or silicon oxide, while the layer 223 may be polysilicon. Each of the layers 222 and 223 has a thickness corresponding to about one quarter of the center wavelength ($\lambda_c$), as measured in the material layers, and thus, may also be referred to as "quarter wave" layers. Throughout this discussion, it is understood that the center wavelength $\lambda_c$, as measured in a material layer, is equal to $\lambda_c^\circ/\eta$, where $\lambda_c^\circ$ is the center wavelength of the device in free space, and $\eta$ is a refractive index of the specific material layer. These coating layers 222 and 223 are used primarily to improve the optical reflectivity of the substrate 220, but in principle can be omitted.

A membrane 230 is spaced apart from the substrate 220 to define an air gap 229 between the membrane 230 and the substrate 220. The membrane 230, or at least a portion thereof that defines the air gap 229, is designed to be movable, or deflectable, such that the spacing of the air gap 229 can be adjusted. Although the term "air gap" is used, it is understood that other appropriate gases, such as inert gases or nitrogen, if desired, may also be used in the gap. However, the presence of moisture or other contaminants should be avoided.

The membrane 230 generally comprises one or more material layers. In one embodiment, the membrane 230 comprises three layers, 225, 226 and 227. Different materials may be used for these layers, e.g., the layer 226 may be a nitride layer such as $SiN_x$, bounded by two polysilicon layers 225 and 227.

By applying an electrical signal (e.g., voltage or current) to one of the polysilicon layers 225 and 227, an electrical bias can be produced across the air gap 229. In other embodiments where the layers 225 and 227 are not sufficiently conductive, a separate conductive portion of the membrane 230 may be provided to allow for electrical biasing. This electrical bias causes the membrane 230 to be deflected from its "unbiased" position, thus changing the spacing of the air gap 229, from its initial (unbiased) spacing to a different spacing, which in turn, results in a change in the reflectivity spectrum of the device 200.

The membrane 230 may either be positively or negatively biased with respect to the substrate 220, which may or may not be grounded. Due to electrostatic attraction, the membrane 230 is deflected towards the substrate 220, thus reducing the spacing of the air gap 229. In principle, magnetostatic forces may also be used for membrane deflection, which can produce deflection of the membrane 230 either towards or away from the substrate 220.

When electrostatic attraction is used for membrane deflection, the air gap 229 preferably has an initial spacing that is larger than $\lambda_c/2$, where $\lambda_c$ is the center wavelength of the device, as measured in the air gap 229. It is desirable to design the device 200 such that a spacing of the air gap 229 ranging from larger than $\lambda_c/2$ to smaller than $\lambda_c/2$ can be obtained by deflection of the membrane 230. When the membrane 230 is deflected to produce a spacing of about $\lambda_c/2$ for the air gap 229, the device 200 (with the membrane 230 having appropriate material layer thicknesses, as will be described below) will have a substantially flat reflectivity spectrum—i.e., one that does not exhibit a tilt as a function of wavelength. It is noted that the air gap 229 may also have a spacing around a multiple integral of $\lambda_c/2$, and a similar response can be obtained from the device 200.

For example, a bias voltage of about 40 V may be used for a device with an active diameter of about 500 microns. In general, the magnitude of the electrical bias required to achieve certain membrane deflection depends on the overall design and the size of the device, which may in turn depend on the specific applications. For example, a membrane having a larger diameter may facilitate ease of focusing or alignment of an incident light beam, but may result in a slower time response. For a membrane with a diameter of about 500 microns, for example, a response time of about 10 microseconds can be achieved.

Figure 3:
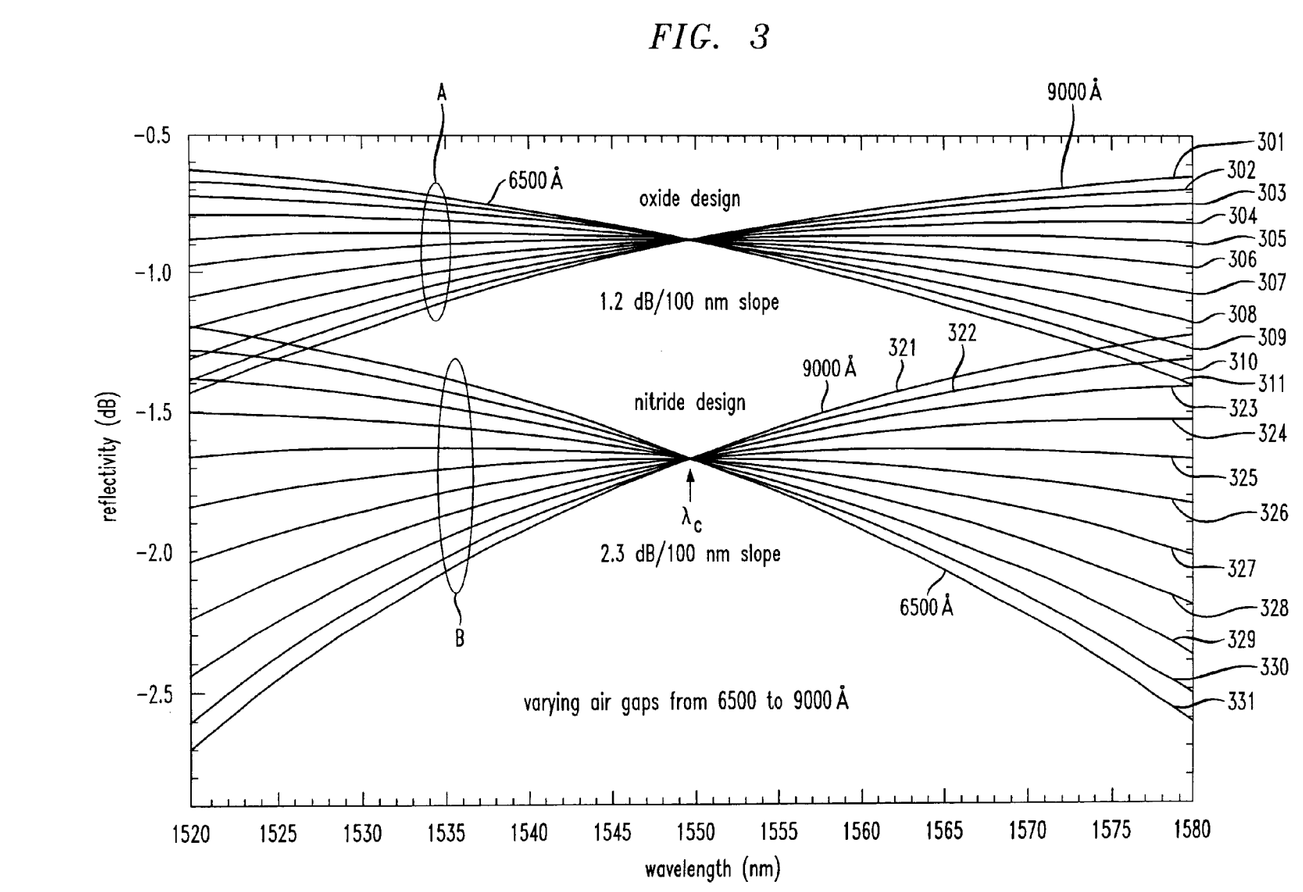
FIG. 3 is a plot of reflectivity spectra for the single-gap device of FIG. 2.

FIG. 3 is a plot of the reflectivity spectra for two different structures of the single-gap device 200. The series A of curves 301–311 correspond to a device in which the coating layer 222 is a $SiO_2$ layer, while the B series of curves 321–331 correspond to a device with a $SiN_x$ layer 222. Curves 301 and 321 correspond to the device with an unbiased air gap spacing of 9000 Å, while curves 311 and 331 correspond to the device with a biased air gap spacing of 6500 Å. The spacing between each of the curves within series A and B represents a change in the spacing of the air gap 229 of about 250 Å due to electrical biasing. As shown in FIG. 3, the curves are nearly linear, which allows for very close compensation of linear variations in power level due to system changes. The amount of compensation can be adjusted by varying the spacing of the air gap 229, and both positive and negative tilts can be compensated.

FIG. 3 also shows that the oxide design device has a higher reflectivity, and thus, lower insertion loss, compared to the nitride design. The higher reflectivity from an oxide coating layer results from a larger mismatch between the refractive index of oxide, which is about 1.5, and that of the silicon substrate, which is about 3.48. However, the nitride design produces a larger tilt in the reflectivity spectrum, with a slope of about 2.3 dB/100 nm. The choice of materials used in the coating layers, or in the membrane, typically involves a trade-off between the insertion loss and the tilt. For applications as an optical power equalizer, a device with low insertion loss and enhanced tilt is usually desirable.

At the center wavelength of the single-gap device 200, there is no change of optical reflectivity from the device 200 with changes in the air gap 229. That is, the optical reflectivity is independent of the position of the membrane 230. This is achieved by designing the membrane 230 to be made up of "half wave" layers—i.e., each of the material layers 225, 226 and 227 has a thickness corresponding to about one half of the center wavelength ($\lambda_c$), as measured in the material layer. According to thin film theory, the membrane 230 comprising half wave (or multiples of half wave) layers will not affect light transmission or reflection at the center wavelength $\lambda_c$. Therefore, the reflectivity of the device 200 at $\lambda_c$ is also independent of the spacing of the air gap 229.

However, at wavelengths less than or greater than the center wavelength $\lambda_c$, the membrane 230 layer thicknesses are no longer equal to one half (or multiples thereof) of the incident wavelength, and changes in the air gap 229 do result in changes in device reflectivity. Depending on whether the measuring wavelength is less than or greater than the center wavelength, the reflectivity changes may be positive or negative with respect to the reflectivity at the center wavelength. Due to this "cross-over" in the reflectivity changes, the center wavelength $\lambda_c$ is also referred to as the cross-over wavelength. As such, the device 200 produces a tilt in its reflectivity spectrum that is dependent on the spacing of the air gap 229, and thus on the electrical bias of the device 200. As shown in FIG. 3, as the spacing of the air gap 229 is decreased from 9000 Å to 6500 Å, the reflectivity spectrum changes from a positive tilt (i.e., higher reflectivity with increasing wavelength) to a negative tilt. As previously discussed, when the membrane 230 is deflected to produce a spacing of the air gap 229 of about $\lambda_c/2$, a substantially flat reflectivity spectrum is obtained.

Dual-Gap Device

Figure 4:
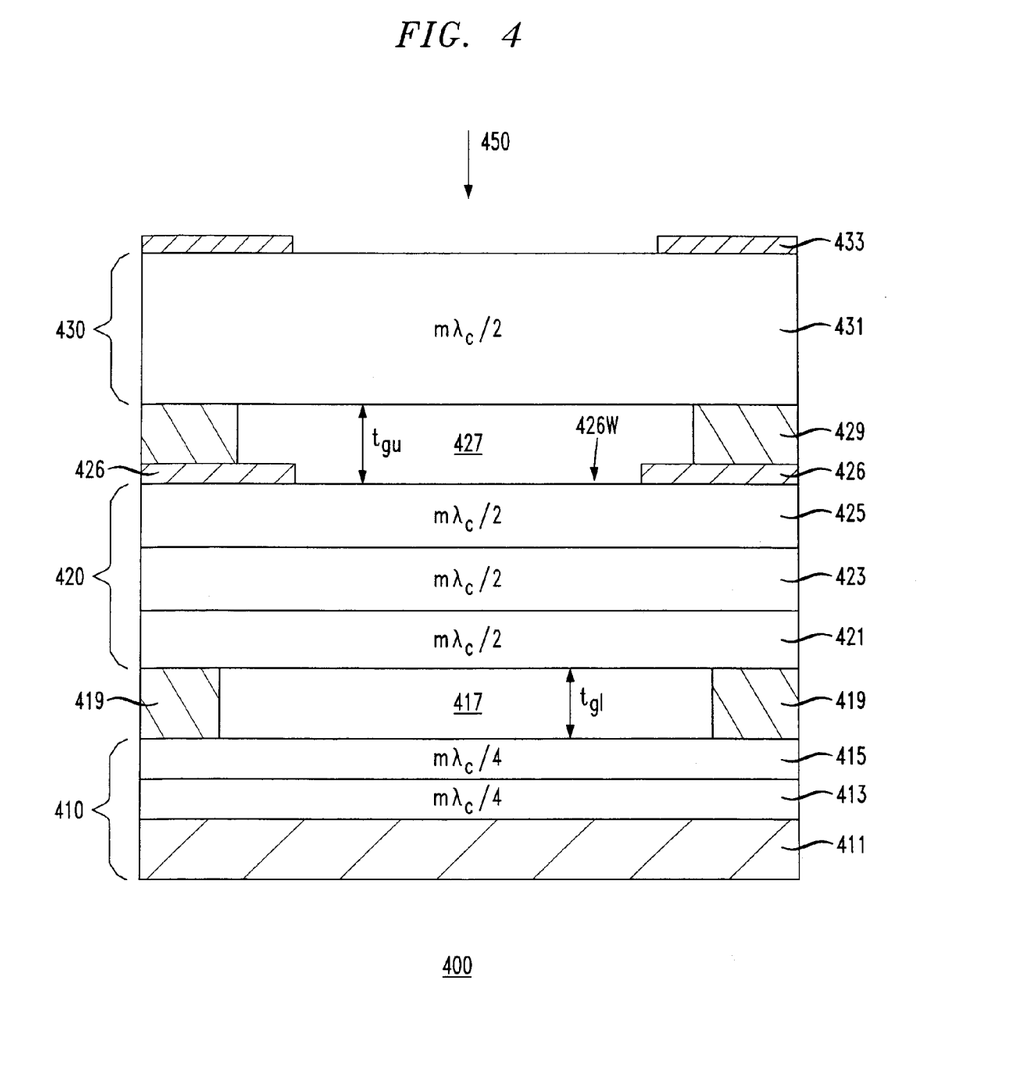
FIG. 4 is a schematic sectional view of a dual-gap device of the invention.

FIG. 4 is a schematic sectional view of a dual-gap device 400 that can be used for enhanced tilt compensation for an incoming signal 450. The dual-gap device 400 comprises material layers similar to those previously described in connection with FIG. 2, and may be fabricated using deposition and patterning techniques that are known in the art. A substrate 410 may comprise an underlying substrate 411, with one or more coating layers 413 and 415, which are optional. More generally, the substrate 410 may comprise one or more material layers. For example, the underlying substrate 411 may be silicon, and the coating layers 413 and 415 may be silicon nitride, silicon oxide, polysilicon or amorphous silicon. If the coating layers are present, then each layer should be a quarter-wave layer—i.e., having a thickness about equal to a quarter of the center or reference wavelength of the device 400, $\lambda_c/4$, or any multiples thereof.

A first, or lower, air gap 417 is defined between a first membrane 420 and the substrate 410, and has a lower gap spacing $t_{gl}$ that can be adjusted by biasing and deflecting the first membrane 420. In general, the lower gap spacing $t_{gl}$ may be given by the following equation:

$$t_{gl}=t_{glo}-\Delta, \quad \text{Equation (1)}$$

where $t_{glo}$ is an "unbiased" lower air gap spacing; and $\Delta$ represents the membrane deflection due to biasing (assuming downward deflection).

The first air gap 417 may be formed by first depositing a layer of support material over the substrate 410, followed by patterning and etching an opening in the support material layer. The opening constitutes the first air gap 417, while the unetched portion 419 of the support material layer acts as a support for the first membrane 420. In one embodiment, the support material is silicon oxide, although other materials, including conducting or insulating ones, may also be used. If the unetched portion 419 of the support material contacts a conductive portion of the first membrane 420, then the support material should be an insulating material.

Similar to the air gap 229 of the single-gap device 200, the first air gap 417 preferably has an unbiased spacing larger than $\lambda_c/2$. It is also preferable that the device 400 be designed such that by biasing the first membrane 420 with respect to the substrate 410, the first air gap 417 can be changed from a spacing larger than $\lambda_c/2$ to one smaller than $\lambda_c/2$. In other embodiments, it is possible that the spacing of the air gap 417 be adjustable around multiples of $\lambda_c/2$.

In one embodiment, the first membrane 420 comprises material layers 421, 423, and 425 each having a thickness equal to a multiple of one half of the cross-over wavelength of the device 400, i.e., $m\lambda_c/2$, where m is any positive integer and may be different for each of the material layers 421, 423 and 425. In general, the first membrane 420 may comprise any number and different combinations of various material layers each having a thickness of $m\lambda_c/2$.

In one embodiment, the material layer 423 is silicon nitride and the layers 421 and 425 are polysilicon. If either of the polysilicon layers 421 and 425 is conductive, then it may be used as an electrode for applying an electrical bias with respect to the substrate 410. However, if the layers 421 and 425 are both non-conductive, e.g., near intrinsic polysilicon, then a separate metal contact 426 may be formed as a conductive portion of the first membrane 420 to allow for electrical biasing. The metal contact 426 may either be formed as a blanket layer, or if it is opaque to the wavelength of the optical signal 450, then a window or opening 426W may be formed in the metal contact layer to allow for passage of the optical signal 450. If the material of the metal contact 426 is optically transparent to the signal 450, then the metal contact 426 may be formed as a blanket layer (i.e., no window) with a thickness of $m\lambda_c/2$, where m is any positive integer.

In the dual-gap device 400, a second, or upper, air gap 427 is defined between another material layer 430 and the first membrane 420. The material layer 430, also referred to as a second membrane, is supported by a support material 429 and spaced apart at an upper gap spacing $t_{gu}$ from the first membrane 420.

Similar to the first membrane 420, the second membrane 430 may comprise different combinations of one or more material layers, e.g., nitride, oxide, polysilicon, or amorphous silicon, among others, with each layer having a thickness equal to half of the center or cross-over wavelength, i.e., $\lambda_c/2$, or any multiples thereof, where $\lambda_c$ is measured within each material layer.

In one embodiment, the second membrane 430 is designed to be fixed in position. In this case, the upper air gap spacing may be given by the following equation:

$$t_{gu}=t_{guo}+\Delta, \quad \text{Equation (1)}$$

where $t_{guo}$ is an "unbiased" upper air gap spacing; and $\Delta$ represents the first membrane deflection due to biasing (assuming downward deflection).

When an electrical bias is applied to the first membrane 420, both air gaps 417 and 427 are changed by the deflection of the first membrane 420. Thus, while one gap spacing increases, the other spacing decreases. For the second, or upper air gap 427, the unbiased spacing is preferably less than about $\lambda_c/2$, such that deflection of the first membrane 420 by electrical biasing can result in the spacing of the upper air gap 427 changing from less than $\lambda_c/2$ to larger than $\lambda_c/2$. If the device 400 is designed such that both the second air gap 427 and the first air gap 417 each has a spacing of about $\lambda_c/2$ (or multiples thereof) at a certain bias, then a substantially flat reflectivity spectrum can be obtained. A flat reflectivity spectrum may be useful when the dual-gap device 400 is used as an optical power equalizer in a WDM system that may have signals having a flat power spectrum.

In another embodiment, the second membrane 430 is designed to be movable. For example, the second membrane 430 may comprise a material layer 431 and a conductive portion 433. When an electrical bias is applied to the conductive portion 433, the second membrane 430 may be deflected, resulting in changes in the spacing the second air gap 427. This design allows the first and the second membranes 420, 430 to be moved independently of each other, resulting in different changes in spacings of the first and second air gaps 417 and 427.

Figure 5:
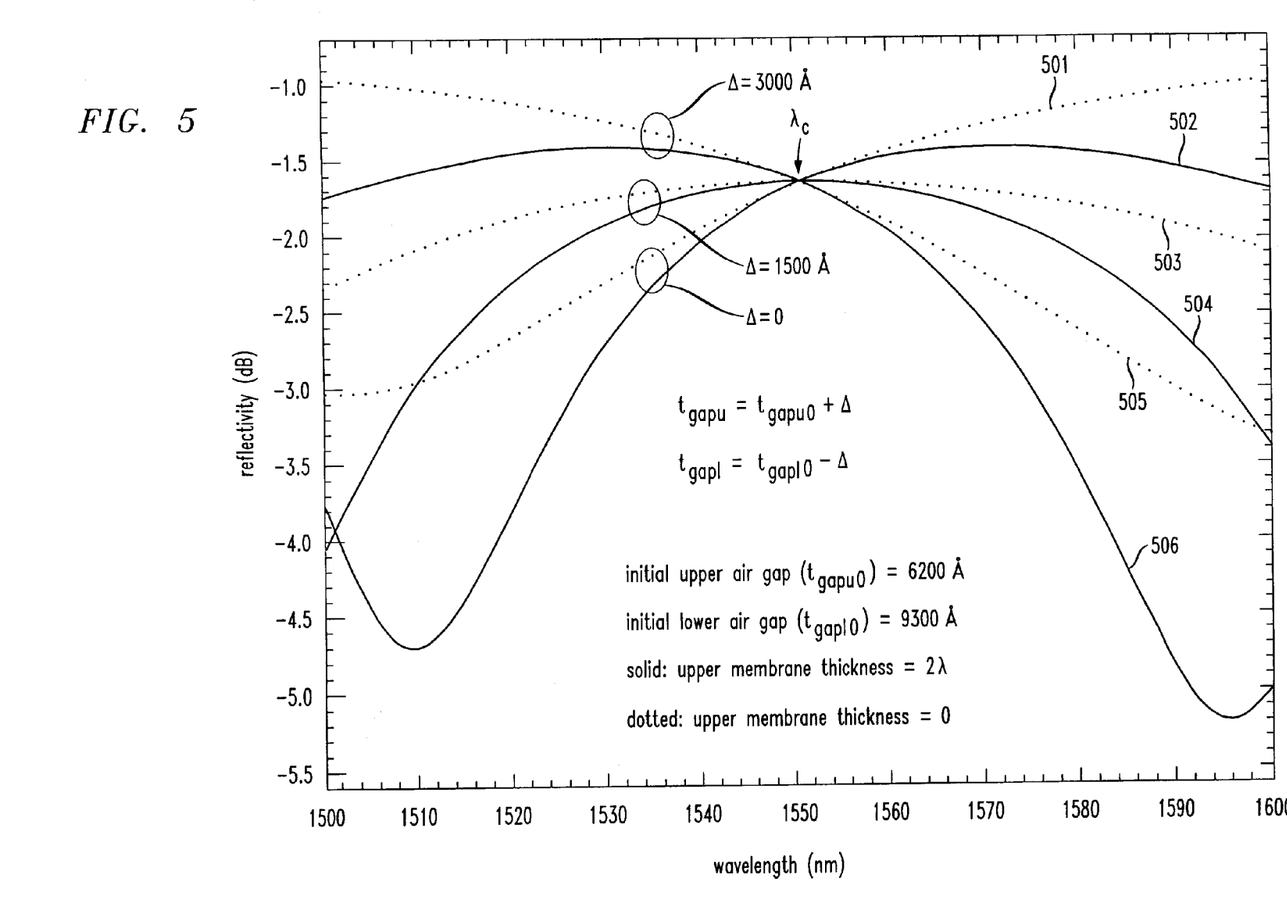
FIG. 5 is a plot of reflectivity spectra for the dual-gap device of FIG. 4.

In either embodiment, the addition of the second air gap 427 produces an enhanced tilt compensation compared to a single-gap device. This enhanced tilt is illustrated in FIG. 5, which shows the reflectivity spectra for a dual-gap and a single-gap device at different air gap spacings. The dual-gap device in FIG. 5 has a fixed upper membrane 430, and both air gap spacings are adjusted by deflection of the first membrane 420.

The dotted traces 501, 503 and 505 correspond to reflectivity changes for a single-gap device (upper membrane thickness=0), while the solid traces 502, 504 and 506 correspond to those for a dual-gap device having a second membrane thickness of $2\lambda_c$. The structure of the dual-gap device used in generating the spectra of FIG. 5 is given in Table 1, with the corresponding reference numerals as indicated 4.

TABLE 1

Example of Dual Gap Device Structure

| | |
|---|---|
| 411 | Silicon substrate |
| 413 | $\lambda_c/4$ SiN$_x$ layer |
| 415 | $\lambda_c/4$ polysilicon layer |
| 417 | Unbiased gap spacing 9300Å |
| 421 | $\lambda_c/2$ polysilicon layer |
| 423 | $\lambda_c/2$ SiN$_x$ layer |
| 425 | $\lambda_c/2$ polysilicon layer |
| 427 | Unbiased gap spacing 6200Å |
| 431 | $2\lambda_c$ SiN$_x$ layer |

Referring to FIG. 5, the traces are generated for three different air gap positions: 1) traces 501 and 502 correspond to the first membrane in its unbiased position—i.e., no change in the air gap spacing (Δ=0); 2) traces 503 and 504 correspond to a change in the air gap spacing of 1500 Å; and 3) traces 505 and 506 correspond to a change in the air gap spacing of 3000 Å. As shown in FIG. 5, for the same amount of air gap change (or membrane deflection Δ), the dual-gap device produces a reflectivity spectrum with a larger slope, i.e., enhanced tilt, than the single-gap device.

Figure 6:
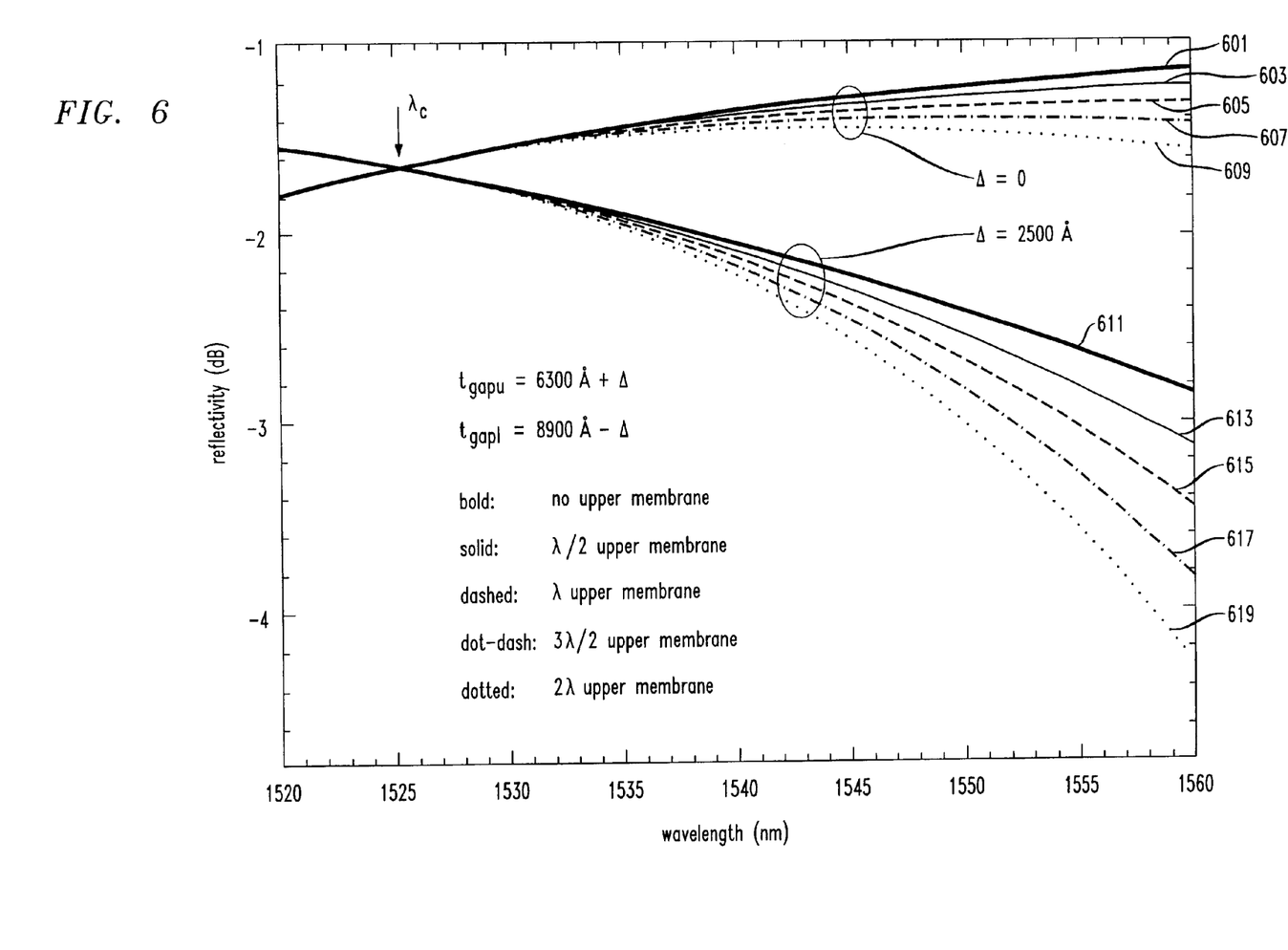
FIG. 6 is a plot of reflectivity spectra for another dual-gap device.

In general, if the thickness of the second membrane 430 is increased, the tilt in the reflectivity spectrum will also be enchanced. This is illustrated in FIG. 6, which shows two sets of reflectivity spectra of a dual-gap device, corresponding to the first membrane at its unbiased and biased position, as a function of different thicknesses of the second (upper) membrane. The dual-gap device has an unbiased first gap spacing of 8900 Å and an unbiased second gap spacing of 6300 Å. The dual-gap device of FIG. 6 has a layer structure similar to the device of FIG. 5, except that the layer thicknesses are changed to result in a cross-over wavelength ($\lambda_c$) of about 1525 nm. This ability to shift the cross-over wavelength of the device allows flexibility in adapting the device for operation with different optical signals.

Traces 603, 605, 607 and 609 are reflectivity spectra for the dual-gap device in its unbiased condition, with respective second membrane thicknesses of $\lambda_c/2$, $\lambda_c$, $3\lambda_c/2$ and $2\lambda_c$. Traces 613, 615, 617 and 619 are reflectivity spectra for the device when the first membrane is deflected by 2500 Å, resulting in a decrease in the first gap spacing and an increase in the second gap spacing. Also shown, for comparison purpose, are traces 601 and 611, which correspond to a single-gap device, with the air gap at its unbiased (Δ=0) and biased (Δ=2500 Å) positions. It can be seen, as indicated by curves 613, 615, 617 and 619, that an increased thickness of the second membrane results in an increased tilt for the same membrane deflection in the dual-gap device.

In general, by varying the combinations of material layers and thicknesses used for the first and second membranes, as well as the spacings of the two air gaps, different performance characteristics can be obtained from such a device.

Thus, the use of such a device provides generally a method of modulating an optical signal, e.g., changing the optical reflectivity spectrum. This can be achieved by moving one of the membranes of the device by electrical biasing to adjust the two gap spacings. In another embodiment, both membranes may be moved to allow for independent adjustment of the two gap spacings. In one embodiment of the method, any tilt in the optical power spectrum of the optical signal can be compensated by using this device as an optical power equalizer.

It is also possible that additional air gaps (e.g., more than two) be incorporated in a device, along with corresponding membranes or material layers, to achieve additional design flexibility and performance by adjusting the various gap spacings.

It is noted that references herein to any material layer thickness or air gap spacing being equal to certain given values also include variations from the exact cited dimensions. For example, it is understood that variations within about plus or minus 10% of any given values are considered acceptable for the purpose of practicing the invention.

System Application

When a dual-gap device is used as an optical power equalizer in a WDM system, it is preferable that power equalization be implemented in a dynamic mode. This involves monitoring the power spectrum of the multiplexed signal as it arrives at the power equalizing device, and the power spectrum is adjusted by changing the voltage on the power equalizing device. Such monitoring can be done continuously, or via a sampling program. If the system variables are known and relatively stable, sampling can be relatively intermittent. A suitable feedback arrangement is shown schematically in FIG. 7. The multiplexed signal from a signal source 751 propagates along long haul fiber 752. Signals from sources 753 and 754 are added to the main channel and represent customers or, groups of customers added to the main trunk at different locations. At the repeater location, represented by amplifier 755, power spectrum equalization is performed by power equalizing device 757. The air gaps of the device are adjusted, in the manner described above, in response to power spectrum analyzer 758, with the appropriate equalization signal fed back to the power equalizing device via feedback loop 759. It is preferred that the power spectrum adjustment be made just prior to the amplification stage, but other arrangements are also useful. The amplified signal continues along fiber 752 to the next repeater, or to the system output represented by demultiplexer 761. Channels may be split from the main channel at any point, as indicated by receiving stations 762 and 763.

It is noted that the optical output of the dual-gap power equalizing device 757 may exhibit non-linearity as a function of wavelength. Thus, an optical filter 770 may optionally be used in conjunction with the power equalizing device 757 to compensate or correct for the non-linearity across the wavelength band of the WDM system. The optical filter 770, which may also be referred to as a correction filter, is used in series with the power equalizing device 757, as shown in phantom in FIG. 7.

Figure 7:
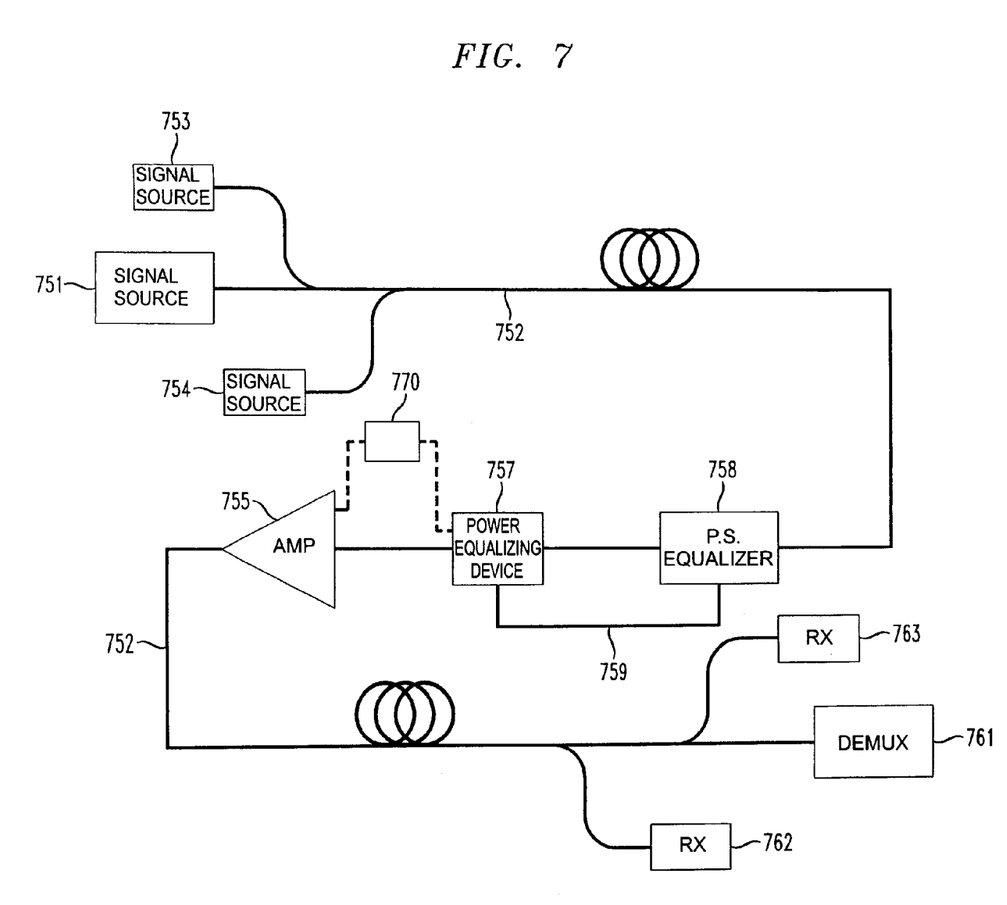
FIG. 7 is a schematic representation of a feedback system for dynamic power equalization.

One example of such an optical filter 770 has been disclosed in commonly-assigned U.S. patent application Ser. No. 09/369,919, entitled "Optical Filter and Method for Linearization of Optical Power Equalizer", filed Aug. 6, 1999, which is incorporated herein by reference in its entirety. The optical filter 770 can be used to correct the non-linearity in signal output of the power equalizing device 757 by providing a transmission response that has an insertion loss that varies across the wavelength band.

Figure 8:
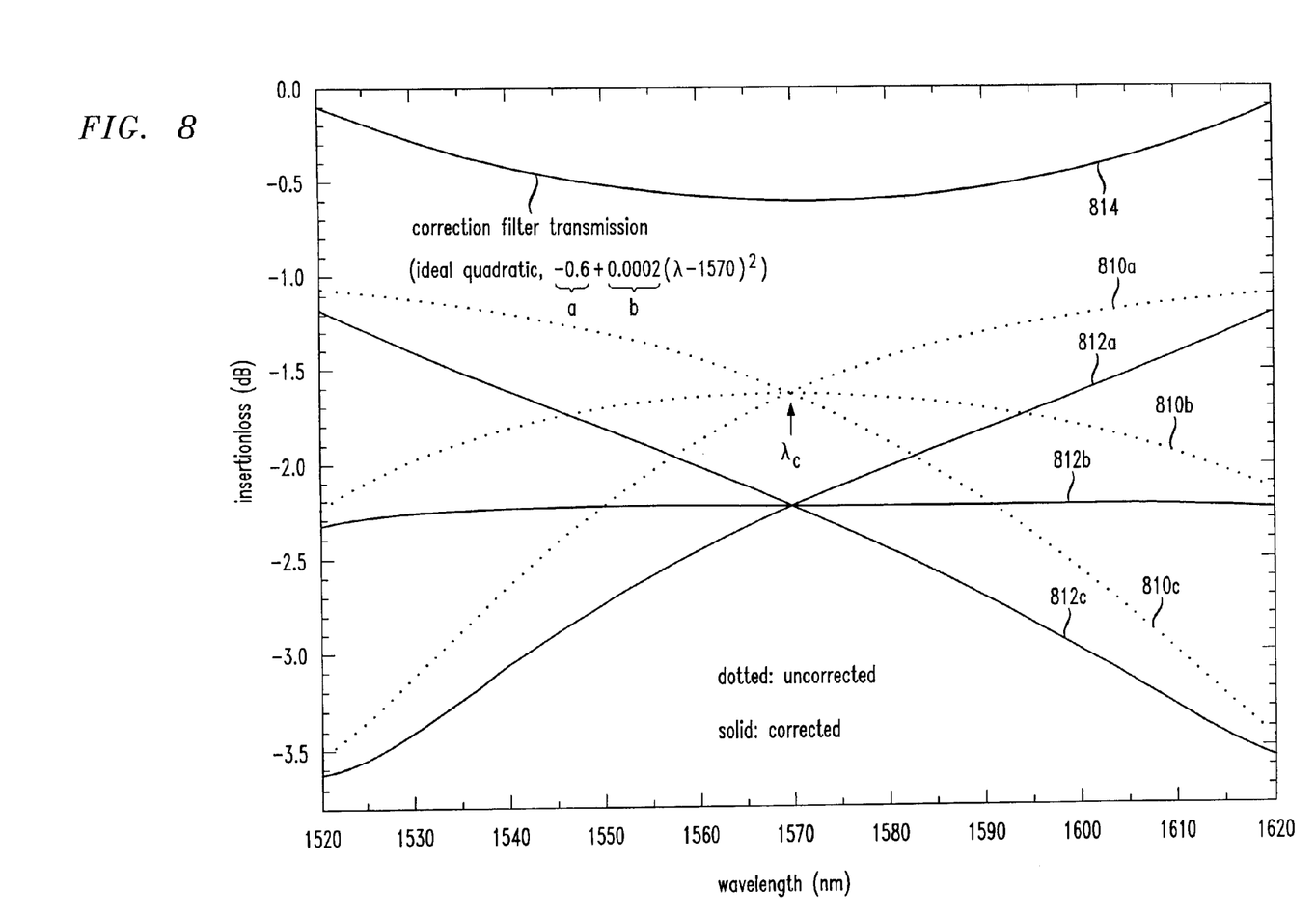
FIG. 8 is a graph illustrating a correction filter transmission curve for correcting non-linearity in an optical power equalizer.

FIG. 8 is a graph illustrating three non-linear outputs 810a, 810b and 810c of an optical power equalizer, e.g., a dual-gap device 400 or a single-gap device 200, and a correction filter transmission curve 814 for correcting the non-linearity. In general, the correction filter transmission curve 814, which is shown as insertion loss in dB, is characterized by a "positive" spectral curvature—i.e., one that is concave upwards. This positive spectral curvature is needed to correct for non-linearity in the output of the optical power equalizer, which has a "negative" spectral curvature. In the example of FIG. 8, the insertion loss curve 814 of the correction filter 770 approximates a quadratic shape, and can be expressed by the following equation:

$$IL = a + b(\lambda - \lambda_c)^2 \quad \text{Equation (1)}$$

where

IL is the insertion loss at any wavelength $\lambda$ within the wavelength band of the WDM system;

$\lambda_c$ is the center wavelength of the wavelength band;

a is an insertion loss at the center wavelength $\lambda_c$ of the wavelength band; and b is a constant relating to the degree of curvature of the insertion loss curve.

For the purpose of this illustration, it is assumed that $\lambda_c$ is the same as the cross-over wavelength of the optical power equalizing device 757. The value of the insertion loss at $\lambda_c$—i.e., "a", should be sufficiently large to allow for enough curvature in the correction filter transmission 814 to adequately correct for non-linearity in the outputs 810a, 810b and 810c of the optical power equalizing device 757. However, it is also desirable that the amount of insertion loss introduced by the correction filter 770 be minimized to avoid unnecessary power loss in the transmitted signal. Thus, the design of the correction filter 770 involves a trade-off between resulting linearity (i.e., after correction) and insertion loss.

As shown in FIG. 8, with the correction filter 770 in series with the optical power equalizer 757, corrected outputs 812a, 812b and 812c, which are approximately linear, are obtained instead of the corresponding non-linear outputs 810a, 810b and 810c. In the example of FIG. 8, the value of "aa" is −0.6 and the value of "b" is 0.0002 for the insertion loss curve 814 used for non-linearity correction for outputs 810a, 810b and 810c. As will be explained below, the structure of the correction filter 770 can be designed to adjust these values for other desired non-linearity corrections.

Figure 9:
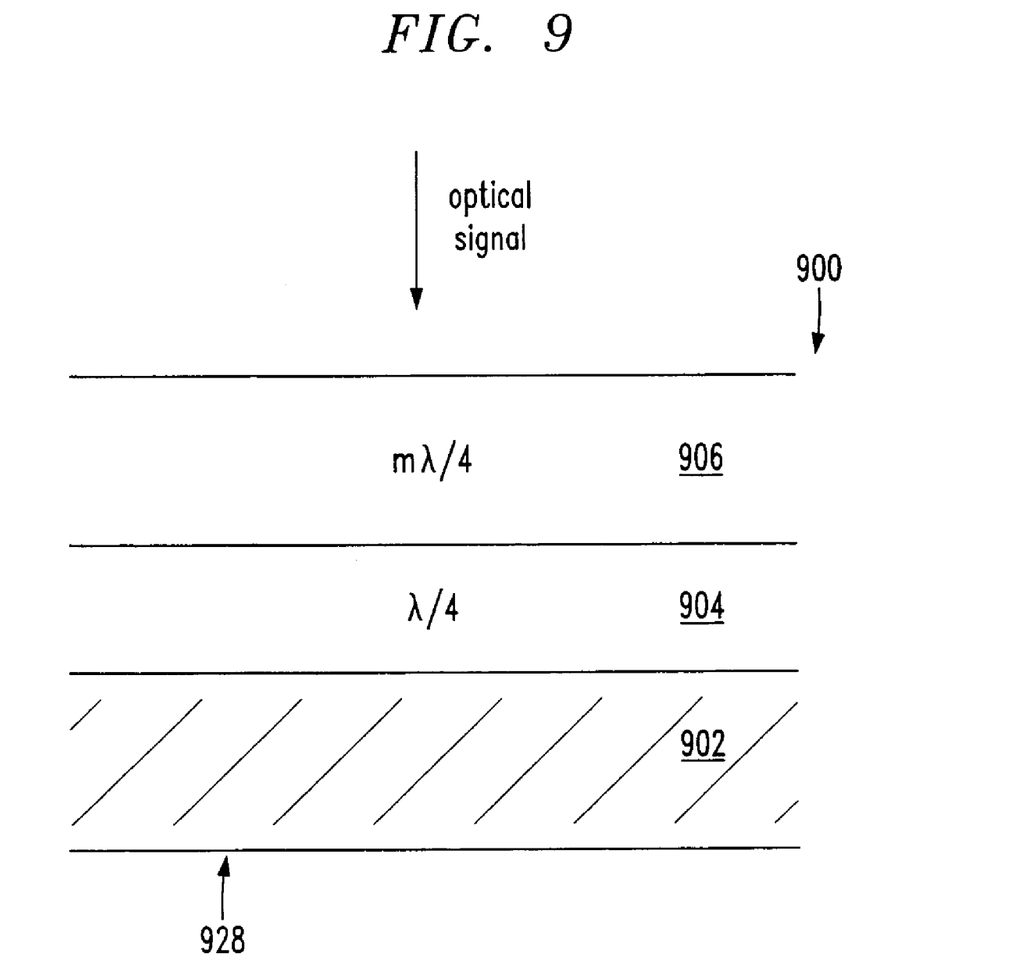
FIG. 9 is an example of a structure for a correction filter.

FIG. 9 is an example of a structure 900 for the correction filter 770. The structure 900 comprises a substrate 902, e.g., a silicon substrate. A first layer 904, which is a quarter-wave layer having a thickness of about $\lambda/4$, as measured within the first layer 904, is formed on the substrate 902. Again, it is understood that in this context, the wavelength $\lambda$ measured within any specific material layer is given by the wavelength in free space $\lambda^\circ$ divided by the refractive index $\eta$ of the specific material layer, i.e., $\lambda = \lambda^\circ/\eta$. The first layer 904 may be made of a material such as silicon nitride (SiNx) having a refractive index denoted by $\eta_{SiNx}$.

A second layer 906, which has a thickness corresponding to an odd multiple of a quarter-wave, i.e., $m\lambda/4$, where m is an odd integer, is then formed on the first layer 904. The second layer 906 may be made of a material such as silicon dioxide ($SiO_2$). The correction filter 770 may optionally include an anti-reflective coated backside 928, which contributes less than about 0.005 dB of insertion loss.

With the structure 900, the amount of insertion loss at $\lambda_c$, through the correction filter 770 is determined by the refractive index $\eta_{SiNx}$ of the silicon nitride layer 904—i.e., the value "a" in Equation (1) can be changed by varying $\eta_{SiNx}$. The slope (or degree of curvature) of the insertion loss curve 814 at any wavelength $\lambda$ away from $\lambda_c$ is dependent on the thickness of the silicon dioxide layer 906—i.e., the value "b" in Equation (1) can be varied by changing the thickness of the oxide layer 906. It is noted that the oxide layer thickness does not affect the correction filter transmission at the center wavelength $\lambda_c$. Thus, by adjusting $\eta_{SiNx}$ of the nitride layer 904 and the thickness of the oxide layer 906, a correction filter 770 may be designed to have an insertion loss curve 814 that is suitable for non-linearity correction for the output of the optical power equalizer 757.

Although silicon nitride and silicon dioxide are used as respective examples of the first material layer 904 and the second material layer 906, other suitable materials may also be used. For example, the first material layer 904 may comprise silicon monoxide, zinc sulfide, or any other materials in which a change in refractive index changes the amount of insertion loss at the center wavelength of the wavelength band. Similarly, the second material layer 906 may comprise materials such as cryolite, magnesium fluoride, or other materials that may affect the degree of curvature of the insertion loss curve of the correction filter 770.

Although several preferred embodiments which incorporate the teachings of the present invention have been shown and described in detail, those skilled in the art can readily devise many other varied embodiments that still incorporate these teachings.

For example, the optical wavelengths of most interest in current photonic devices are 1.3 μm and 1.55 μm. These wavelengths correspond to spectral regions of ultra high transparency and resultant transmission efficiency in silica based transmission media. However, the invention described above is useful for any optical wavelength, e.g., 0.5–2.0 μm, with suitable adjustment of the device dimensions. Furthermore, it is also possible to apply the concept of the invention, e.g., by using different substrate material layers, to modify the device to operate as a transmission filter.

The invention has been described in terms of a silicon substrate and silicon optoelectronic devices. It will occur to those skilled in the art that various forms of hybrid structures can also be used thus allowing flexibility in the choice of material for the optoelectronic device. As such, it is understood that the term "substrate" may generally comprise one or more material layers. In particular, gallium arsenide devices are widely used in lightwave technology. In the case of the movable membrane device of the invention, the electrical function of the device does not require a semiconductor material and a wide variety of conductive materials for the device substrate are possible. In the context of this disclosure, semiconductor materials such as silicon are intended to be within the definition of conductive materials. For other forms of optical modulators, crystal materials like lithium niobate could be used. In each of these cases the active device itself can be mounted or bonded on a silicon substrate to obtain the advantages of this invention.

What is claimed is:

1. A device comprising:
   (a) a substrate;
   (b) a first membrane having a movable portion spaced apart from the substrate at a first position to define a first gap spacing between the movable portion and the substrate;
   (c) a second membrane spaced apart from the first membrane to define a second gap spacing between the second membrane and the first membrane;
   wherein the first gap spacing and the second gap spacing can be varied by moving the movable portion of the first membrane from the first position to a second position thereby causing changes in an optical response of the device; and
   wherein the first membrane and the second membrane comprise respective optically transparent portions to allow passage of an optical signal to the substrate.

2. The device of claim 1, wherein the first membrane further comprises a conductive portion for receiving an electrical bias with respect to the substrate to effect movement of the movable portion.

3. The device of claim 2, wherein the second membrane further comprises a movable portion adapted for movement for changing the second gap spacing.

4. The device of claim 3, wherein the second membrane further comprises a conductive portion for receiving an electrical bias with respect to the substrate to effect movement of the movable portion of the second membrane.

5. The device of claim 1, wherein the optical response of the device is optical reflectivity.

6. The device of claim 5, wherein:
   the first membrane further comprises one or more material layers each characterized by a thickness;
   the second membrane further comprises one or more material layers each characterized by a thickness;
   and wherein each of the thicknesses for each of the one or more material layers is about equal to an integral multiple of $(\lambda_c/2)$, where $\lambda_c$ is a wavelength, as measured within each of the one or more material layers, at which the optical reflectivity of the device is independent of the position of the first membrane.

7. The device of claim 6, wherein the first gap spacing can be decreased and the second gap spacing can be increased by moving the movable portion of the first membrane from the first position towards the substrate.

8. The device of claim 7, wherein the first gap spacing and the second gap spacing can be varied around $\lambda_c/2$.

9. The device of claim 6, wherein the one or more material layers in the first membrane is selected from the group of nitride and oxide.

10. The device of claim 9, wherein the first membrane comprises at least one silicon nitride layer.

11. The device of claim 10, wherein the first membrane further comprises a conductive portion.

12. The device of claim 11, wherein the conductive portion in the first membrane consists essentially of silicon.

13. The device of claim 6, wherein the first membrane consists of a nitride layer disposed between a first silicon layer and a second silicon layer.

14. The device of claim 13, wherein the first silicon layer and the second silicon layer are polysilicon layers.

15. The device of claim 6, wherein the one or more material layers in the second membrane is selected from the group of silicon nitride and silicon oxide.

16. The device of claim 6, wherein the second membrane comprises at least one silicon nitride layer.

17. The device of claim 15, wherein the second membrane further comprises a conductive portion.

18. A device, comprising:
   (a) a silicon-containing substrate;
   (b) a first membrane having a movable portion spaced apart from the silicon-containing substrate at a first position to define a first gap spacing between the movable portion and the substrate, where the first membrane consists of a silicon nitride layer disposed between two polysilicon layers;
   (c) a second membrane spaced apart from the first membrane to define a second gap spacing between the second membrane and the first membrane, where the second membrane consists of a silicon nitride layer;
   wherein the first gap spacing and the second gap spacing can be varied by moving the movable portion of the first membrane from the first position to a second position thereby causing changes in optical reflectivity of the device.

19. The device of claim 18, wherein the silicon-containing substrate consists of a silicon substrate having a polysilicon layer and a silicon nitride layer formed thereon.

20. The device of claim 19, wherein the polysilicon layer and the silicon nitride layer of the silicon-containing substrate each has a thickness of about $\lambda_c/4$, the silicon nitride layer and the polysilicon layer of the first membrane each has a thickness equal to about $\lambda_c/2$, and the silicon nitride layer of the second membrane has a thickness equal to about $2\lambda_c$, where $\lambda_c$ is a wavelength, measured within the respective polysilicon and silicon nitride layers of the silicon-containing substrate, the first membrane and the second membrane, at which the optical reflectivity of the device is independent of the position of the first membrane.

21. The device of claim 20, wherein the first gap spacing can be decreased and the second gap spacing can be increased by moving the movable portion of the first membrane from the first position towards the substrate.

22. The device of claim 21, wherein the first gap spacing and the second gap spacing can be varied around $\lambda_c/2$.

23. The device of claim 18, wherein $\lambda_c$ lies within a range of between about 0.5 $\mu$m to about 2.0 $\mu$m.

24. A wavelength division multiplexed (WDM) system, comprising:
   (a) a WDM signal source;
   (b) a power spectrum analyzer;
   (c) a power spectrum equalizer comprising:
      (i) a substrate;
      (ii) a first membrane having a movable portion spaced apart from the substrate at a first position to define a first gap spacing between the movable portion and the substrate;
      (iii) a second membrane spaced apart from the first membrane to define a second gap spacing between the second membrane and the first membrane;
      wherein the first gap spacing and the second gap spacing can be varied by moving the movable portion of the first membrane from the first position to a second position thereby causing changes in an optical response of the power spectrum equalizer;
   (d) an optical amplifier;
   (e) a WDM signal receiver;
   (f) optical fiber interconnections between (a), (b), (c), (d) and (e); and
   (g) a feedback loop for transmitting a signal from the power spectrum analyzer to the power spectrum equalizer.

25. The WDM system of claim 24, further comprising a correction filter connected in series between the power spectrum equalizer and the optical amplifier for correcting non-linearity in an output of the power spectrum equalizer.

26. The WDM system of claim 25, wherein the correction filter comprises:
   (i) a first material layer having a thickness of about $\lambda_c/4$ and a first refractive index;
   (ii) a second material layer having a thickness of about $m\lambda_c/4$ and a second refractive index; where $\lambda_c$ is a center wavelength of a wavelength band in the WDM system, and m is an odd positive integer.

27. The WDM system of claim 26, wherein the correction filter has an optical transmission curve given by a quadratic function in wavelength, and the optical transmission curve at any wavelength $\lambda$ within the wavelength band is characterized by a maximum insertion loss at $\lambda_c$ and a degree of curvature.

28. The WDM system of claim 27, wherein the maximum insertion loss at $\lambda_c$ can be varied by changing the first refractive index and the degree of curvature can be varied by changing the thickness of the second material layer.

29. A method of modulating an optical signal, comprising:
   (a) providing a device for receiving the optical signal; the device having at least three material layers defining at least two adjustable gaps characterized by a first and a second gap spacings; wherein two of said three material layers comprise respective optically transparent portions to allow passage of an optical signal to the third material layer; and
   (b) changing an optical response of the device by adjusting the first and the second gap spacings.

30. The method of claim 29, wherein the optical response of the device is optical reflectivity.

31. The method of claim 29, wherein the first and the second gap spacings are adjusted by moving one of the at least three material layers.

32. The method of claim 31, wherein the one of the at least three material layers is moved by applying an electrical bias thereto.

33. The method of claim 29, wherein the first and the second gap spacings are adjusted by moving at least two of the at least three material layers by electrical biasing.

34. A method of transmitting a wavelength division multiplexed (WDM) signal, comprising:
   (a) propagating a WDM signal through a power spectrum analyzer to generate a power spectrum of the WDM signal;
   (b) directing the WDM signal from the power spectrum analyzer to a power spectrum equalizer comprising a device having at least three material layers defining at least two adjustable gaps characterized by a first and a second gap spacings;
   (c) providing a feedback loop between the power spectrum analyzer and the power spectrum equalizer; and
   (d) compensating for a tilt in the power spectrum of the WDM signal by adjusting the first and the second gap spacings to change an optical response of the device.

35. The method of claim 34, wherein the first and the second gap spacings are adjusted by applying an electrical bias to one of the at least three material layers, and the optical response of the device is optical reflectivity.

36. The method of claim 34, wherein the first and the second gap spacings are adjusted by electrical biasing at least two of the at least three material layers, and the optical response of the device is optical reflectivity.

* * * * *